Jan. 23, 1968   R. L. DILLS ET AL   3,364,912
SELF-CLEANING GAS OVEN

Filed Sept. 22, 1966   3 Sheets-Sheet 2

INVENTORS
RAYMOND L. DILLS
BY & BOHDAN HURKO
*Richard L. Caelin*
THEIR ATTORNEY

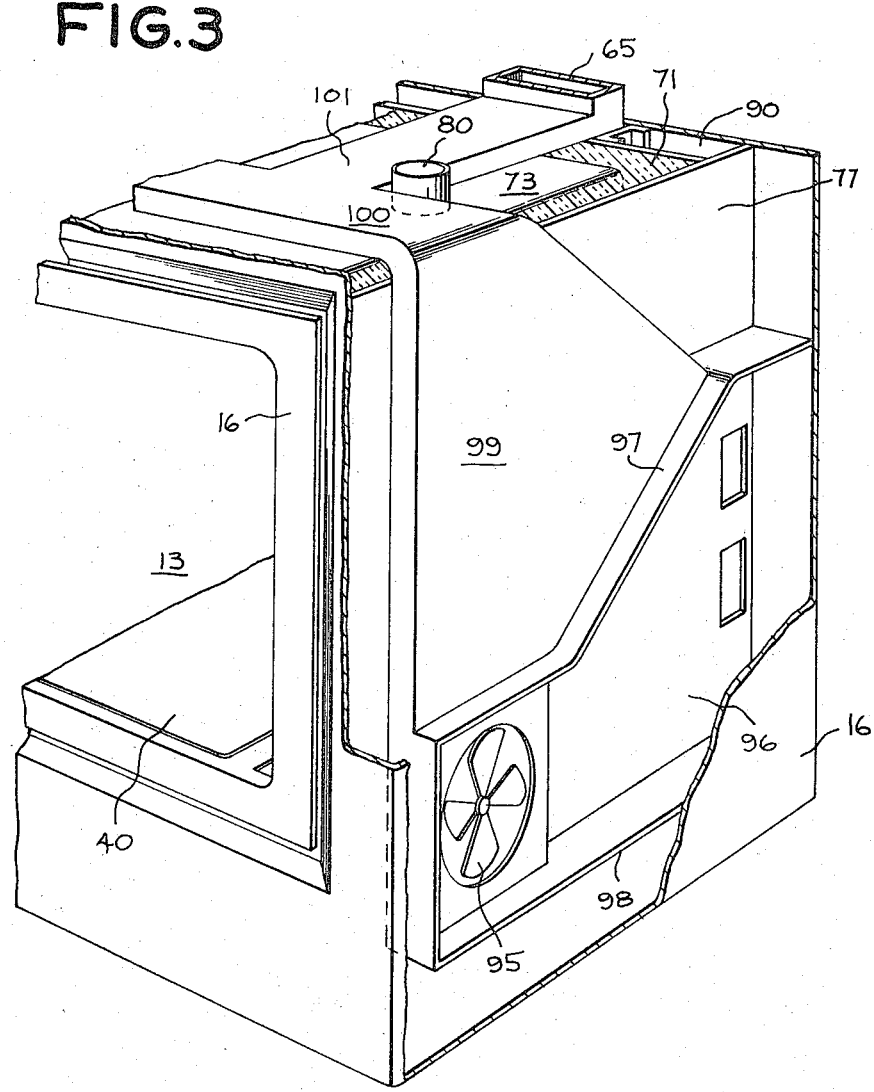

United States Patent Office  3,364,912
Patented Jan. 23, 1968

3,364,912
SELF-CLEANING GAS OVEN
Raymond L. Dills, and Bohdan Hurko, Louisville, Ky., assignors to General Electric Company, a corporation of New York
Filed Sept. 22, 1966, Ser. No. 581,293
20 Claims. (Cl. 126—21)

The present invention relates to domestic baking ovens and particularly to an oven having gaseous fuel burners in combination with a self-cleaning oven design that are capable of being operated on a pyrolytic cycle for automatically degrading the food soils that become baked-on the inner surfaces of the walls forming the oven cavity during normal cooking operations.

An earlier invention in the art of self-cleaning ovens is described in the patent of Bohdan Hurko No. 3,121,158 which issued on Feb. 11, 1964 and is assigned to the General Electric Company, the assignee of the present invention. Such a self-cleaning oven recommends a cleaning cycle with a maximum oven wall temperature somewhere between about 750° F. and about 950° F. for a sufficient period of time for degrading the food soils into gaseous products which are then passed through an oxidation unit or smoke eliminator which oxidizes the gases before they are returned to the kitchen atmosphere.

Popular models of gas ovens are provided with walls forming a cooking cavity and a fire box containing a gas burner located beneath the cooking cavity. These oven walls are insulated with thermal insulating material for retaining the heat therein. Apertures are formed in the bottom portion of the oven cavity walls so that the hot flue gases may enter the cooking cavity and cook the food placed therein. Moreover, an oven vent means is provided for exhausting these hot gases from the oven cavity and returning them to the kitchen atmosphere. A major difficulty in employing this same manner of heating the walls forming the oven cavity during a self-cleaning cycle is that the volume of hot flue gases that would be necessary to complete the task within a reasonable time would be excessive. It would be most difficult to oxidize such a large volume of flue gases and remove the smoke, odors and vapors that would become entrained therein due to the degradation of the food soils from the walls of the oven cavity. The oxidation unit which is provided for treating the gases would either become overloaded or would have to be of such a large size as to be prohibitive for this particular application. Moreover, the exhaust temperature of the flue gases tends to become critically high thereby requiring a temperature limiting means.

Much success has been gained in diverting the flow of hot flue gases during the self-cleaning cycle by first substantially sealing the walls of the oven cavity from the hot gases and passing the flue gases around the outside of such walls for heating the walls externally and in mixing relatively cool air with the flue gases before the gases are returned to the kitchen atmosphere.

The principal object of the present invention is to provide a gas oven with the capability of a self-cleaning pyrolytic cycle using an external method of applying heat to the walls of the oven liner so that these walls may rise gradually at substantially uniform temperatures throughout to a maximum that is much higher than the maximum cooking temperature.

A further object of the present invention is to provide a gas oven with a self-cleaning pyrolytic cycle where the hot flue gases for heating the oven walls are prevented from mixing with the gaseous degradation products that are produced as the food soils are being removed from the oven walls.

A further object of the present invention is to provide a gas oven with a pyrolytic cycle where the temperature of the hot gases exhaustnig from the oven are held below a critically high temperature.

A further object of the present invention is to provide a gas oven that is heated internally for normal cooking operations and is heated by external means for a self-cleaning operation at which time the oven cavity is substantially sealed from the hot flue gases which are used to transfer the heat to the oven walls.

A further object of the present invention is to provide a self-cleaning gas oven with partitioned heating channels for directing a greater amount of heat towards the front of the oven cavity for heating the oven door and obtaining generally uniform wall temperatures throughout.

A still further object of the present invention is to provide a self-cleaning gas oven with an external heating means for the walls of the oven cavity where this heating means further serves to activate a self-heating oxidation unit for oxidizing the effluent that is created in the oven cavity due to the decomposition of the food soils which are transformed into gaseous products at heat cleaning temperatures greatly above the maximum cooking temperatures.

The present invention, in accordance with one form thereof, is embodied in a gas oven either domestic or commercial, having walls in cooperation with an oven door for forming an oven cavity, and a fire box positioned beneath the cavity walls and containing a gas burner means. Thermal insulation surrounds much of the walls of the oven cavity. First openings are formed in the lower portion of the oven walls so that convection currents of hot gases may enter the cavity and circulate throughout, and finally exhausting through a first oven vent means. A sealing means is provided so as to substantially seal the oven cavity from the hot gases during a self-cleaning cycle. An oxidation unit is provided for the oven for receiving the gaseous products of decomposed food soils and further oxidizing them before exhausting them through a second vent means. During such a self-cleaning cycle, the hot flue gases would be caused to flow in heating channels located between the walls of the oven liner and the thermal insulation so that heat energy is transferred to the walls externally of the oven cavity. Finally, a third vent means is provided for exhausting the hot gases from the heating channels. Alternatively, during normal cooking operations these heating channels will be sealed and the oven cavity would be unsealed or opened to the hot flue gases being generated in the fire box.

In some circumstances, it is well to mix relatively cool air with the hot flue gases just prior to the gases leaving the oven structure so as to lower the exhaust temperatures into a comfortable temperature range. Other improvements would be to provide cooling channels surrounding the layer of insulation and just inside of the outer oven housing so as to retard the rise in temperature of the outer oven housing while the oven temperature is within the self-cleaning temperature range. Other refinements are to supply additional heat toward the front of the oven for heating up the inner surface of the oven door so as to obtain generally uniform temperature distribution throughout the walls of the oven cavity during the self-cleaning cycle.

Our invention will be better understood from the following description taken in conjunction with the accompanying drawings and its scope will be pointed out in the appended claims.

FIGURE 3 is a fragmentary view, similar to that of FIGURE 2, showing in perspective a modification of the means for cooling the walls of the outer oven housing.

Figure 1:
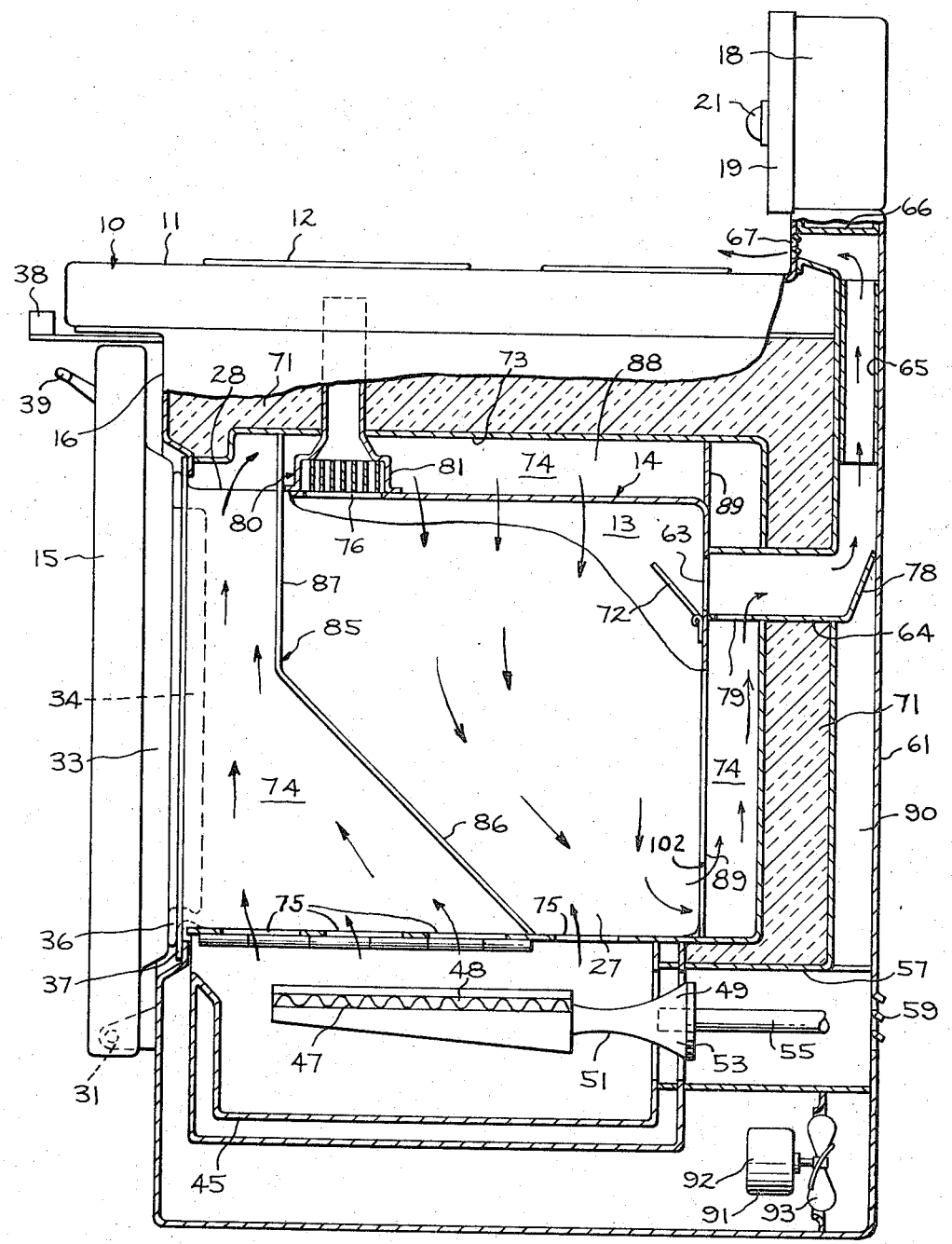
FIGURE 1 is a right side elevational view of a freestanding domestic gas range embodying the present invention with parts broken away and some in cross-section to show many of the important features thereof.

Turning now to a consideration of the drawings, and in particular to FIGURE 1, there is shown a free-standing domestic gas range 10 in right side elevational view comprising a horizontal cooktop 11 supporting a plurality of surface gas burners 12. Located therebeneath is an oven cooking cavity 13 formed by an inner oven liner 14 and a front-opening oven door 15, all supported from an outer oven housing 16 which serves as a cabinet for supporting the cooktop 11. A backsplash 18 is located along the back edge of the cooktop 11, and it includes a front control panel 19 for supporting a plurality of surface and oven burner controls 21, as is conventional in this art.

Figure 2:
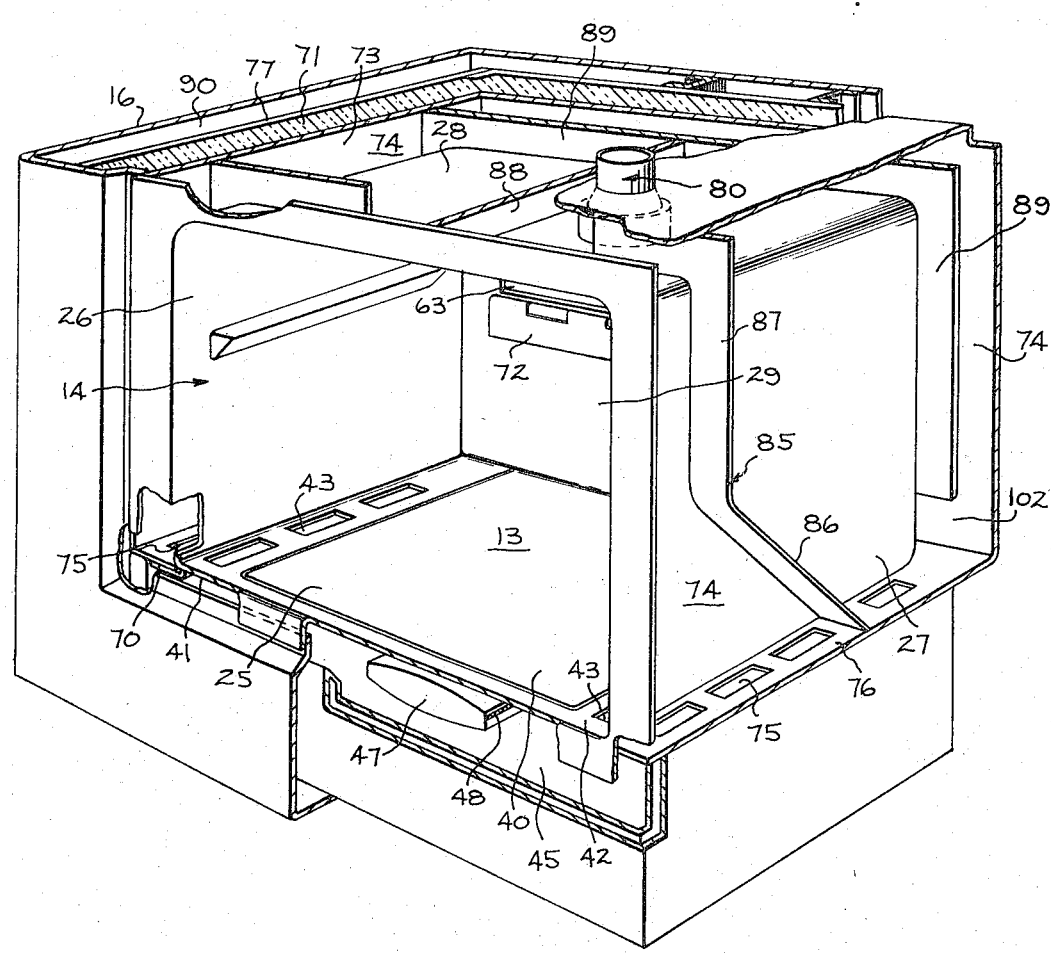
FIGURE 2 is a fragmentary perspective view of the oven of the gas range of FIGURE 1 with parts broken away to show the interior of the inner oven liner, the heating channels that surround the oven liner, the layer of insulation which surrounds the heating channels, the cooling channels which surround the layer of insulation and finally the outer oven housing.

The inner oven liner 14 is of box-like construction, as is best seen in FIGURE 2, and it has a bottom wall 25, opposite side walls 26 and 27, top wall 28 and a back wall 29. The front portion of the inner oven liner 14 is open and it is adapted to be closed by the oven door 15 that is hinged along its bottom edge by the hinge means shown at 31 in FIGURE 1. This oven door is of fabricated sheet metal construction that is heavily insulated and provided on its inner side with gradually tapering stepped portions 33 and 34, as is best seen in FIGURE 1, so as to serve in the manner of a plug member for sealing the front opening of the inner oven liner 14. The oven door 15 supports a high temperature door gasket 36 of woven fiber glass or the like which is adapted to bear against an annular flange 37 on the front edge of the inner oven liner 14 so as to substantially seal the door gap between the inner surface of the door and the mouth of the inner oven liner. As is conventional in this art, a door handle 39 is provided adjacent the free edge of the door for use in moving the door between the opened and closed positions.

There is also a door latch mechanism 38, depicted by a showing of a door latch handle, for locking the oven door 15 during the pyrolytic cycle at temperatures above about 550° F. so that access may not be gained to the oven cavity at temperatures above normal cooking temperatures. One example of a satisfactory oven door latch mechanism is taught in the patent of Clarence Getman No. 3,189,375, which is assigned to the same assignee as is the present invention. As will be well understood by those skilled in this art, a suitable door interlock system would be necessary between the door latch mechanism and the control system for the oven heating means to preclude the operation of the pyrolytic cycle unless the oven door is locked, as well as to preclude the unlocking of the door until the oven temperature drops back to the normal cooking temperature range.

As seen in FIGURE 2, the bottom wall 25 of the inner oven liner 14 is provided with a removable central section 40 for gaining access therebeneath, and opposite side plates 41 and 42 which are integral with the side walls 26 and 27. Each side plate is provided with a series of hot gas inlet openings 43, as is generally conventional in this art. Looking at FIGURE 1, there is a fire box 45 positioned beneath the bottom wall 25 of the inner oven liner 14, and this fire box contains a gas burner 47 of generally planar construction that is provided with gas flame ports 48 in the opposite side edges thereof. The rear end of the burner 47 comprises a mixture tube 49 adapted to mix the gas fuel with primary air so as to form a combustible mixture. This mixture tube has a constricted throat or venturi portion 51 and a bell-shaped end 53 that is open to the atmosphere. Telescopically received within this bell-shaped end 53 is a gas supply tube 55 such that the passage of the gas through the venturi portion 51 draws primary air into the rear end of the bell-shaped portion 53. As is conventional in this art, but not shown herein, the gas burner 47 would be provided with an automatic pilot or ignition means and a safety interlock or detection system for insuring that the gas supply to the burner 47 will be discontinued in the event the pilot is not functioning properly. Primary air is supplied to the burner 47 through the bell-shaped end 53, while secondary air passes around the burner 47 for completing the combustion mixture. In order to prevent the inadvertent extinguishment of the pilot light and to insure a satisfactory air supply for the main burner and thereby avoid the generation of carbon monoxide, a tubular housing 57 surrounds the rear portion of the burner 47 and is joined to the rear portion of the fire box 45 and is open to ambient air through the louvers 59 in the rear wall 61 of the outer oven housing 16.

Turning back to FIGURE 1, the oven cavity 13 is provided with an oven vent opening 63 in the back wall 29 of the inner oven liner 14 and it cooperates with a horizontal exhaust duct 64 extending toward the back of the oven, and joins with a vertical exhaust duct 65 which rises up the back of the oven until it turns forwardly at 66 to exhaust beneath the backsplash 18 as at 67 and fan out across the surface of the cooktop 11.

During the normal use of the oven in carrying out baking and broiling operations (gas burner for broiling not shown), food soils and grease spatter accumulate upon the interior surfaces of the inner oven liner 14 and the inner panel of the oven door 15. Of course, a standard gas broiling burner could be used or alternatively an electric broiling element of the metal sheathed resistance heating type might be adapted so that the oven would be a combined gas and electric oven. Moreover, such an electric broiling element could be used during the heat cleaning cycle to reduce the volume and temperature of the flue gases. These food soils of grease and food spatter are exceedingly difficult to remove or clean off by ordinary scrubbing or washing due to the chemical nature of such food soils. Such food soils fundamentally comprise proteins, fats, fatty acids, and carbohydrates. Proteins are made up largely of aminoacids, such as glycine, alanine, cystine, etc.; and fats essentially comprise the esters of the corresponding fatty acids. Fatty acids are normally classified as saturated and unsaturated. Saturated fatty acids include the typical acids: capric, lauric, palmitic, stearic, etc.; and unsaturated fatty acids include the typical acids: palmitoleic, oleic, linoleic, etc. Carbohydrates are normally classified as monosaccharides (glucose, fructose, etc.) and polysaccharides (sucrose, lactose, starch, cellulose, etc.).

It has been discovered that this whole complex range of compounds of which food soils are composed may be degraded by heat during a short time interval of about two hours in an optimum heat-cleaning temperature range extending from about 750° F. to about 950° F. with the production of a substantial range of gaseous degradation products, including hydrocarbons, water vapor, carbon dioxide, some free carbon, etc.

It has also been discovered in the operation of a pyrolytic process in a gas oven that there are many important advantages in externally heating the walls of the inner oven liner 14. First, it is well to seal the cooking cavity 13 from the hot flue gases flowing from the fire box 45. Studying FIGURES 2 and 4, there is a pivoted damper 70 that is adapted to be moved across the openings 43 to close such openings in the bottom wall 25 of the inner oven liner. A similar maneuver takes place with respect to the oven venting means 63. There is a pivoted damper 72 shown in its open position in FIGURE 2 that is adapted to be moved across the vent opening 63 and prevent oven air movement therethrough. It will be understood by those skilled in this art that in some instances it is not necessary to close both the gas inlet openings 43 and the oven vent 63 in order to seal the oven cavity from the hot flue gases. To close either one would substantially seal the oven cavity from the flow of hot flue gases.

Figure 4:
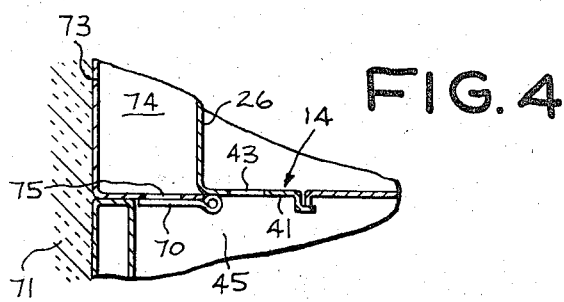
FIGURE 4 is a fragmentary view of the lower left hand corner of the inner oven liner depicting the openings in the lower portion of the oven liner and the openings leading into the heating channels, and damper means for alternately opening and closing the two sets of openings.

A layer of thermal insulating material 71 surrounds the inner oven liner 14 or at least the vertical walls 26, 27 and 29 and the top wall 28 of the inner oven liner 14. The insulating material 71 is spaced and held outwardly from the inner oven liner 14 by an outer oven liner 73 to form a heating channel 74 therebetween. The exterior surface of the insulation is supported by walls 77 which form an insulation guard. As best seen in FIGURE 2, the lower portion of the heating channel 74 is furnished with a series of openings 75 in a panel 76 which is formed as a horizontal extension of the bottom wall 25 of the inner oven liner. These openings 75 allow for the free flow of hot flue gases from the fire box 45 into the heating channel 74, as is illustrated in FIGURE 4. Hence, these hot gases completely encompass the inner oven liner 14 until they are exhausted at the back portion of the oven where they enter through an opening 79 in the horizontal exhaust duct 64 and travel through ducts 65 and 66 to vent 67.

Notice that the rearmost end of the horizontal duct 64 is provided with an upwardly inclined deflector 78 in the vertical duct 65. This deflector 78 is only of narrow width, substantially the width of the duct 64, while the vertical duct 65 is a wide duct about a foot in width. Hence, the deflector 78 does not close off the vertical passage of air through the duct 65 as might be first concluded from the showing of FIGURE 1.

It is deemed desirable to prevent the flow of hot flue gases through the heating channels 74 during normal cooking operations. Hence, the damper 70 which is adapted to serve to close the openings 43 in the inner oven liner is used alternately to close the openings 75 at the lower reaches of the heating channels 74 as is illustrated in FIGURE 4. These dampers 70 and 72 may be operated manually or they may be joined by suitable cables or linkage (not shown) to the door latch mechanism 38 so that when the door is unlatched the dampers are in the normal cooking position of FIGURE 2. Moreover, when the door is latched the dampers 70 and 72 automatically close the oven cavity. Another feature of the heating channels 74 is that during normal cooking operations the channels are closed and form a dead air space which increases the insulating characteristics of the oven design.

It is also necessary to provide a vent means for the cooking cavity 13 during the self-cleaning cycle, and this is in the form of an oxidation unit 80 that is positioned over an opening 76 in the top wall 28 of the inner oven liner 14 and includes a hollow housing 81 supporting a perforated ceramic block of cellular construction such as is sold by the Corning Glass Co. under the tradename Cercor. A catalytic coating of platinum or the like covers the cellular surfaces that are exposed to the smoke, odors and vapor that are generated during the degradation of the food soils lodged on the walls of the cooking cavity so as to reduce the temperature at which oxidation occurs. The surface area of the cells is large to provide a greater area of contact between the gases and the catalyst. Hence, at a minimum temperature of approximately 400° F. smoke, odors and other undesirable gaseous products present in the effluent start to undergo an exothermic reaction and increase the rate of temperature rise of the ceramic block above the rate of temperature rise of the air and walls of the cooking cavity until the undesirable products have been incinerated. Such a self-heating oxidation unit is described and claimed in a copending application of the present applicants in application Ser. No. 396,551 which was filed on Sept. 15, 1964 and is likewise assigned to the General Electric Company, the assignee of the present invention.

An improved performance is obtained if the hot flue gases coming from the fire box 45 are directed over the outside of the oxidation unit as soon as possible before much of the heat energy is extracted from the hot flue gases. Accordingly, the oxidation unit 80 is positioned toward the front of the oven where the gases are the hottest. An alternative would be to add a supplementary electric heater (not shown) to the oxidation unit to obtain an immediate heating action.

It is well to furnish more heat toward the front of the oven so as to replenish the heat lost through and around the door as well as to heat up the inner door panel so as to obtain generally uniform temperature gradients throughout the walls of the cooking cavity. One possibility would be to enlarge the front portion of the burner 47. Notice in the right side wall of FIGURE 2, the upright partition or baffle 85 which has a forwardly inclined lower section 86 for deflecting the hot flue gases rising from three of the four openings 75 toward the front of the oven, and a vertical section 87 so that the hot flue gases tend to pass up and around the throat of the inner oven liner 14. There is also a vertical, horizontally disposed partition 88 which extends from the front of the oven to the back of the inner oven liner to divide the heating channel 74 into two generally symmetrical side sections. There is also a back partition 89, generally in the plane of the back wall 29 of the inner oven liner 14. The lower portion of this back partition 89 is cropped as at 102 in FIGURE 2. Thus, the main path of the hot flue gases is from the fire box 45 up through the side openings 75 into the front-most section of the heating channels 74 until they pass over the oxidation unit 80 and the top of the oven liner and are deflected rearwardly from which they move downwardly through the heating channels at the sides of the oven liner until they flow under the partition 89 and rise up the vertical duct of the heating channel 74 and out the opening 79 in the exhaust duct 64 as is seen in FIGURE 1.

It has also been found expedient to provide a means for cooling the side walls of the outer oven housing 16 to hold down the temperatures thereof to a comfortable temperature range on the order of 194° F. in an ambient temperature of 70° F. Accordingly, as seen at the left side of the oven in FIGURE 2, there is a cooling channel 90 located between the walls of the insulation guard 77 and the walls of the outer oven housing 16. There is always a certain amount of air leakage into these cooling channels 90 since no attempt is made to form a hermetic assembly between mating parts of the oven so that the relatively cool room air enters the cooling channel 90 from beneath the oven and in through the joints between mating parts at the front of the oven. As is best seen in the modification of FIGURE 1, a flow inducing means 91 is located at the rear of the bottom portion of the oven housing. This means is in the form of a motor 92 and fan blades 93 for drawing the cooling air through the cooling channels 90 and mixing the cooling air with the hot flue gases in the vicinity of the deflector 78 before the air and flue gas mixture is discharged from the exhaust vent 67, thus reducing the exhaust temperature of the flue gases to about 400° F. before the gases are returned to the room. As a general rule this cooling means would only be relied upon when the oven is being operated on a high temperature self cleaning cycle.

FIGURE 3 shows a second modification of a flow inducing means for the cooling channel 90. A fan 95 is located in each side panel of the oven structure. In this event, the relatively cool room air is brought in through suitable openings (not shown) in the back wall 61 of the outer oven housing 16 and drawn forwardly through a duct 96 formed by converging partitions 97 and 98. The fan 95 causes the cool air to flow through another converging duct 99 which rises up the sides of the insulation guard 77 of the oven and enters a horizontal top duct 100 which is located beneath the cooktop 11. This duct 100 is provided with a rearward extension 101 which is connected into the exhaust duct 65 of FIGURE 1. The particular location and type of cooling air flow-inducing means is not critical to the practice of the present invention, and a free choice between several different modifications may be had without departing from the scope of the present invention.

Modifications of this invention will occur to those skilled in this art therefore it is to be understood that this invention is not limited to the particular embodiments disclosed but that it is intended to cover all modifications which are within the true spirit and scope of this invention as claimed.

What we claim as new and desire to secure by Letters Patent of the United States is:

1. In a self-cleaning gas oven comprising walls forming an inner oven liner, a fire box located beneath the inner oven liner and containing a gas burner means serving as a source of heating energy, control means for governing the action of the gas burner means, openings formed in the inner oven liner adjacent the bottom portion thereof for allowing heated air to enter the inner oven liner during normal cooking operations, and a first vent means located adjacent the top portion of the inner oven liner for exhausting the heated air from the inner oven liner; the invention comprising means for rendering the inner oven liner substantially self-cleainng by the process of pyrolysis, said means including an outer oven liner having openings providing access to the fire box and surrounding the vertical walls and the top wall of the inner oven liner for the passage of flue gases in a heating channel therebetween for heating up the walls of the inner oven liner to remove food soils that were previously deposited on the inner surfaces of the inner oven liner during normal cooking operations, means for closing the openings in the inner oven liner and means for closing the first vent means for the inner oven liner, a second vent means located adjacent the top portion of the inner oven liner and including therewith a smoke and odor eliminating oxidation unit for receiving the food soil in the form of gaseous degradation products, means for closing the access opening between the fire box and the passage between the inner and outer oven liners during normal cooking operations, a third vent means for exhausting the flue gases from the said passage, insulation means surrounding the outer oven liner for retaining the heat energy of the oven, and an outer oven housing surrounding the insulation means and serving as a structural supporting member.

2. A self-cleaning gas oven as recited in claim 1 with the addition of cooling channels located between the said insulation means and the outer oven housing, and a draft inducing means for passing relatively cool room air through the cooling channels for maintaining the temperatures of the outer oven housing below a predetermined upper limit.

3. A gas oven comprising a substantially box-like inner oven liner having a front opening, and an oven door cooperating with the opening for defining an oven cooking cavity and allowing access thereto, a fire box located beneath the inner oven liner, gas burner means positioned in the fire box, first openings formed in the bottom portion of the inner oven liner adjacent the side edges of the bottom wall to receive hot flue gases into the cooking cavity, a first vent means located adjacent the top portion of the inner oven liner for exhausting the hot gases from the cooking cavity; and an oven structure for rendering the inner wall surfaces bounding the oven cavity substantially self-cleaning by a process of pyrolysis, said oven structure comprising an outer oven liner surrounding at least the vertical walls and the top wall of the inner oven liner and forming heating channels for the passage of hot gases therebetween, second openings formed between the lower end of the heating channels and the fire box for receiving hot gases therethrough, a second vent means for exhausting the hot gases from the heating channels, and adjustable means for closing the first openings in the inner oven liner, and adjustable means for closing the second openings leading to the heating channels, whereby during normal cooking operations between about 150° F. and 550° F. the first openings are open and the second openings are closed whereby the hot flue gases from the gas burner means are allowed to pass through the first openings into the cooking cavity and to exit through the first vent means, while during a pyrolytic operation at an inner oven liner wall temperature greatly above the normal cooking temperatures the first openings are closed, and the second openings are open to allow the hot flue gas flow through the heating channels and out through the second vent means, an oxidation unit located in the top portion of the inner oven liner to treat the smoke and odors generated during the degradation of the food soils from the walls forming the oven cavity, and duct means for exhausting the oxidation unit outside of the oven.

4. A gas oven as recited in claim 3 wherein a layer of insulating material surrounds the outer oven liner for retaining heat therein, and an outer oven housing surrounds the layer of insulating material and is spaced outwardly therefrom to form cooling air channels for retarding the rise of temperature of the outer oven housing.

5. A gas oven as recited in claim 3 wherein the heating channels are provided with partitions so that the hot gases are first concentrated more toward the front portion of the inner oven liner for heating the oven door, then the hot flue gases are adapted to pass over the oxidation unit and then down over the rear portion of the inner oven liner and finally exiting through the second vent means.

6. A gas oven as recited in claim 5 with the addition of a blower means positioned in the cooling air channels for drawing in relatively cool room air and passing this cool air through the cooling channels and finally mixing the cool air with the exhaust from the heating channels so as to lower the temperature of the hot gases exhausting from the oven.

7. The method of cleaning food soils from the interior surfaces of both an inner oven liner and an oven door that together define an oven cooking cavity, comprising the steps of producing hot flue gases within a fire box located beneath the inner oven liner, passing the hot gases through heating channels formed around the inner oven liner for uniformly raising the temperature of the walls of the cooking cavity to temperatures between about 750° F. and about 950° F., and mixing relatively cool room air with the hot gases before exhausting the hot gases from the oven.

8. The method of cleaning baked-on food soils from the interior surfaces of both an inner oven liner and an oven door forming a cooking cavity of a gas oven, wherein said inner oven liner is provided with a fire box and gas burner means located thereneath and with a layer of insulation surrounding said liner, said method comprising the steps of first sealing the inner oven liner from the hot flue gases from the fire box, opening heating channels between the inner oven liner and the layer of insulation and passing the hot flue gases through said channels for uniformly raising the temperature of the walls of the cooking cavity to temperatures between about 750° F. and about 950° F., and exhausting the hot flue gases from the oven structure, and treating in an oxidation unit the effluent of smoke and odors emanating in the cooking cavity from the degradation of the food soils which further oxidizes the effluent before it is exhausted from the oven structure.

9. The method of cleaning baked-on food soils from the interior surfaces of a cooking cavity formed by an inner oven liner and an oven door wherein a gas burner means is positioned within a fire box beneath the inner oven liner and there is a layer of insulation surrounding said oven liner, said method comprising the steps of sealing the cooking cavity from the hot flue gases of the fire box, opening heating channels between the inner oven liner and the layer of insulation and passing the hot flue gases through said channels for uniformly raising the temperature of the walls of the cooking cavity to temperatures greatly above normal cooking temperature for decomposing the food soils on the walls forming the cooking cavity, and exhausting the hot flue gases from the heating channels and the oven structure, treating in an oxidation unit the effluent of smoke and odors emanating in the cooking cavity from the degradation of the food soils which oxidizes the effluent before it is exhausted from the oven structure, and passing relatively cool room air over the outside of the layer of insulation for retarding the rise of temperature of the outside of the oven structure, and mixing the cooling air with the exhaust of the hot flue gases just prior to the flue gases leaving the oven structure for cooling down the flue gases into a comfortable temperature range below about 400° F.

10. In a cooking apparatus comprising an outer supporting structure, walls forming an oven cavity, one wall of the cavity including a door for gaining access thereto, heat-insulating material surrounding the oven cavity for retaining the heat therein, gas burner means located in a fire box beneath the oven cavity for cooking foods placed therein, first openings in the bottom portion of the oven cavity wall for the passage of hot flue gases into the oven cavity, first vent means in the top portion of the walls of the oven cavity for the passage of the flue gases from the oven cavity; the invention comprising the use of a first sealing means for closing the first openings and the first vent means, heating channels formed between at least some of the walls of the oven cavity and the heat-insulating material, second openings for the passage of flue gases from the fire box to the heating channels, and a second sealing means for closing the said second openings during normal cooking operations, a second vent means for the passage of the flue gases from the heating channels, an oxidation unit mounted in one wall of the oven cavity for the treatment of the effluent due to the degradation of food soils from the walls of the oven cavity, and a third vent means for the oxidation unit for removing the effluent therefrom.

11. A cooking apparatus as recited in claim 10 wherein the first sealing means for closing the first openings and the second sealing means for closing the second openings are a single operating means which work in an alternate manner so as to open the second openings when closing the first openings as well as opening the first openings when closing the second openings.

12. A gas oven comprising an outer oven housing supporting a box-like inner oven liner, one wall of the oven liner having a door mounted therewith for gaining access thereto and forming an oven cavity, a layer of insulating material at least around the vertical walls and the top wall of the oven liner, heating channels between the oven liner and the layer of insulation, cooling channels between the layer of insulation and the outer oven housing, gas burner means located in a fire box beneath the oven liner, first openings in the bottom portion of the oven liner for the passage of the hot gases from the fire box to the oven cavity, a first vent means in the oven liner for exhausting the hot flue gases therefrom, second openings between the lower portion of the heating channels and the fire box, first sealing means for closing the second openings during normal cooking operations, second sealing means for closing the first openings during a self-cleaning cycle for the passage of flue gases through the second openings into the heating channels for raising the temperatures of the oven liner greatly above the normal maximum cooking temperature, second vent means for the heating channels for exhausting the hot gases therefrom, a third sealing means for closing the first vent means during the self-cleaning cycle, an oxidation unit in the oven liner for receiving and treating the effluent generated in the oven cavity during the degradation of the food soils in the self-cleaning cycle, a third vent means from the oxidation unit for exhausting the effluent therefrom, air moving means for forcing a draft of relatively cool room air through the cooling channels for lowering the temperature of the outer oven housing.

13. A gas oven as recited in claim 12 wherein there is a mixing chamber for receiving the hot gases of the heating channels and the cool air of the cooling channels just prior to their exhausting from the oven structure for lowering the temperature of the hot exhaust gases.

14. A gas oven as recited in claim 12 wherein the heating channels are divided by partitions so that most of the hot flue gases are directed first toward the front of the oven liner for heating the oven door and replenishing the heat lost through and around the door for obtaining generally uniform temperatures of the walls forming the oven cavity, the hot gases later passing over the rear portion of the oven liner before reaching the said second vent means.

15. A gas oven as recited in claim 14 wherein the said oxidation unit is located toward the front of the oven liner so that the unit becomes quickly heated by the hot flue gases before the gases transfer a large portion of their heating energy to the walls of the oven liner.

16. In a gas oven, the method of cleaning food soils from the interior surfaces of both an inner oven liner and an oven door forming a cooking cavity, wherein said inner oven liner is provided with a fire box and gas burner means located thereneath and with a layer of insulation surrounding said liner, said method comprising the steps of substantially sealing the inner oven liner from the hot flue gases from the fire box, opening heating channels between the inner oven liner and the layer of insulation and passing the flue gases through said channels for uniformly raising the temperature of the walls of the cooking cavity to temperatures between about 750° F. and about 950° F., and exhausting the flue gases outside of the oven structure, while when the oven is operated for normal cooking, the heating channels are substantially sealed and the flue gases are passed into the oven cavity, and exhausting the flue gases from the oven cavity.

17. A cooking apparatus comprising an outer supporting structure, walls forming an oven cavity, one wall of the cavity including a door for gaining access thereto, heat insulating material surrounding the oven cavity for retaining the heat therein, gas burner means located in a fire box beneath the oven cavity for cooking foods placed therein, first openings in the oven cavity walls for the passage of hot flue gases into the oven cavity, first vent means in the top portion of the oven cavity walls for the passage of the flue gases from the oven cavity, heating channels formed between the oven cavity walls and the insulating material, second openings between the fire box and the heating channels, second vent means for the heating channels, sealing means for the oven cavity, whereby the hot flue gases travel through the heating channels for raising the temperature of the oven cavity walls in a pyrolytic cycle to a temperature range between about 750° F. and about 950° F. for a sufficient time to degrade the food soil on the oven cavity walls, cooling channels formed between the insulating material and the outer supporting structure, and blower means for passing room air through the cooling channels for reducing the outside wall temperatures, and a mixing chamber for mixing both the hot flue gases with the cooling air for reducing the exhaust temperature of the flue gases to below about 400° F. before the gases are returned to the room.

18. A self-cleaning gas fired domestic cooking oven comprising walls forming a cooking chamber, gas burner means located outside of said cooking chamber, means for passing gases heated by said burner means through said cooking chamber for normal cooking operations, and means for cleaning the interior surfaces of said cooking chamber of food soils deposited thereon during said normal cooking operations, said cleaning means including means for blocking the passage of said gases through said cooking chamber, and passageway means for passing said gases around the exterior of said chamber in heat transfer relation with said chamber walls at a rate of heating effective to raise the temperature of said walls substantially above the maximum normal cooking temperature, thereby to degrade said food soils and so clean said cooking chamber.

19. The oven of claim 18 including an outer oven housing surrounding said cooking chamber, said gas burner means and said passageway means; and means for mixing the hot gases flowing through said passageway means during the cleaning operation with cooling air before said gases are exhausted from said housing.

20. A self-cleaning gas fired cooking oven comprising walls forming a cooking chamber, gas burner means located outside of said cooking chamber for heating said chamber for normal cooking operations, and means for cleaning the interior surfaces of said walls of the cooking chamber of food soils deposited thereon during said normal cooking operations, said cleaning means including passageway means for passing gases heated by gas burner means around the exterior of said chamber in heat transfer relation with said chamber walls at a rate of heating effective to raise the temperature of said walls substantially above the maximum normal cooking temperature, thereby to degrade said food soils and so clean said cooking chamber.

References Cited
UNITED STATES PATENTS

| | | | |
|---|---|---|---|
| 3,121,158 | 2/1964 | Hurko | 126—273 X |
| 3,310,046 | 3/1967 | Scott et al. | 126—21 |

FREDERICK L. MATTESON, Jr., *Primary Examiner.*

E. G. FAVORS, *Assistant Examiner.*